United States Patent [19]
Alkhazov et al.

[11] Patent Number: 5,891,415
[45] Date of Patent: *Apr. 6, 1999

[54] PROCESS FOR SELECTIVE OXIDATION OF HYDROGEN SULFIDE TO ELEMENTAL SULFUR

[75] Inventors: Tofik G. O. Alkhazov, Baku, Azerbaijan; Roland E. Meissner, III, La Canada, Calif.

[73] Assignee: Azerbaidzhanskaya Gosudarstvennaya Neftianaya Academiya, Baku, Azerbaijan

[ * ] Notice: This patent issued on a continued prosecution application filed under 37 CFR 1.53(d), and is subject to the twenty year patent term provisions of 35 U.S.C. 154(a)(2).

[21] Appl. No.: 444,812

[22] Filed: May 17, 1995

[51] Int. Cl.$^6$ .................................................. C01B 17/04
[52] U.S. Cl. ..................................... 423/573.1; 423/576.8; 423/230
[58] Field of Search .............................. 423/576.8, 573.1, 423/231, 230

[56] References Cited

U.S. PATENT DOCUMENTS

| | | | |
|---|---|---|---|
| 4,088,736 | 5/1978 | Courty et al. | 423/230 |
| 4,192,857 | 3/1980 | Tellier et al. | 423/576 |
| 4,233,276 | 11/1980 | D'Souza et al. | 423/230 |
| 4,311,683 | 1/1982 | Hass et al. | 423/573 G |
| 4,313,820 | 2/1982 | Farha, Jr. et al. | 208/213 |
| 4,363,790 | 12/1982 | Anderson et al. | 423/230 |
| 4,371,507 | 2/1983 | Farha, Jr. et al. | 423/230 |
| 4,371,728 | 2/1983 | Farha, Jr. et al. | 585/258 |
| 4,427,576 | 1/1984 | Dupin | 502/218 |
| 4,519,992 | 5/1985 | Alkhazov et al. | 423/230 |
| 4,544,534 | 10/1985 | Dupin et al. | 423/230 |
| 4,576,925 | 3/1986 | Alkhazov et al. | 502/307 |
| 4,629,612 | 12/1986 | Van Der Wal et al. | 423/244 |
| 4,690,806 | 9/1987 | Schorfheide | 423/230 |
| 4,722,799 | 2/1988 | Ashbrook et al. | 210/722 |
| 4,732,888 | 3/1988 | Jha et al. | 502/406 |
| 4,818,740 | 4/1989 | Berben et al. | 502/313 |
| 4,871,521 | 10/1989 | Pendergraft | 423/230 |
| 4,886,649 | 12/1989 | Ismagilov et al. | 423/230 |
| 5,037,629 | 8/1991 | Berben et al. | 423/576.8 |
| 5,244,641 | 9/1993 | Khare | 423/220 |
| 5,286,697 | 2/1994 | van den Brink et al. | 502/257 |
| 5,366,717 | 11/1994 | Dorchak et al. | 423/570 |

FOREIGN PATENT DOCUMENTS

| | | | |
|---|---|---|---|
| 000293688A | 7/1988 | European Pat. Off. | |
| 0293688 | 12/1988 | European Pat. Off. | 423/231 |
| 59-230618 | 12/1984 | Japan | 423/231 |
| 59-230618A | 12/1984 | Japan . | |
| 11871813 | 10/1981 | Russian Federation . | |
| 11967551 | 10/1982 | Russian Federation . | |
| 146141 | 6/1920 | United Kingdom | 423/576.8 |
| 1273738 | 10/1968 | United Kingdom . | |
| 1273738 | 5/1972 | United Kingdom | 423/231 |
| 2152489 | 8/1985 | United Kingdom . | |
| 2164867 | 4/1986 | United Kingdom . | |

OTHER PUBLICATIONS

Patent Cooperation Treaty International Search Report, dated Jul. 24, 1996, by Examiner Timothy C. Vanoy.

*Primary Examiner*—Gary P. Straub
*Assistant Examiner*—Timothy C Vanoy
*Attorney, Agent, or Firm*—Sheldon & Mak; Denton L. Anderson

[57] ABSTRACT

A process for selectively converting $H_2S$ to S, utilizing a porous catalyst having the atomic proportions covered by the formula $Fe_A Zn_B$, wherein A has a value of 0.5 to 10 and B has a value of 1 to 2. The catalyst contains substantially no chromium. A gas stream comprising hydrogen sulfide and oxygen is passed over the catalyst at a temperature above the dew point of sulfur and up to about 300° C.

30 Claims, No Drawings

PROCESS FOR SELECTIVE OXIDATION OF HYDROGEN SULFIDE TO ELEMENTAL SULFUR

CROSS-REFERENCES

The present application is related to U.S. patent application Ser. No. 08/443,252 (now U.S. Pat. No. 5,603,913), filed on the date as this application and entitled "CATALYSTS AND PROCESS FOR SELECTIVE OXIDATION OF HYDROGEN SULFIDE TO ELEMENTAL SULFUR".

BACKGROUND

The claimed invention relates to novel catalysts for use in processes for the selective oxidation of hydrogen sulfide to form elemental sulfur.

As is known, many gases, both natural and industry generated, contain hydrogen sulfide ($H_2S$). For example, the $H_2S$ content of natural hydrocarbon gases can be up to 25%. Hydrotreater gases, synthesis gases from coal gasification, and the like also contain $H_2S$. It is very important to convert the $H_2S$ into sulfur for many reasons.

One reason is that the presence of hydrogen sulfide in a gas, even in very small quantities, decreases the value of the gas, often making the gas valueless. This is because $H_2S$ has a noxious smell, is highly corrosive, is an extremely strong poison for most living things, including humans, and is a poison for many catalysts.

Hydrogen sulfide conversion into elemental sulfur ($S_x$) can be carried out by two different principle methods:

(a) Decomposition, according to reaction:

$$H_2S \rightarrow H_2 + 1/x\, S_x \quad (1)$$

(b) Oxidation, according to reactions:

$$H_2S + \tfrac{1}{2}O_2 \rightarrow H_2O + 1/x\, S_x \quad (2)$$

$$H_2S + \tfrac{1}{2}SO_2 \rightarrow H_2O + \tfrac{3}{2x}\, S_x \quad (3)$$

In the second method, in addition to $O_2$ and $SO_2$, other oxidants can be used, such as $H_2O_2$, $NO_x$, and the like.

From a practical point of view, the most attractive way of sulfur production from hydrogen sulfide is selective oxidation by using oxygen from air, according to reaction:

$$H_2S + \tfrac{1}{2}O_2 \rightarrow H_2O + 1/x\, S_x \quad (4)$$

Reaction (4) is thermodynamically possible over a very wide range of industrially acceptable temperatures. Without a catalyst, however, the rate of reaction is low and the reaction is noticeable only at temperatures higher than 300° C. However, reaction (4) is accompanied by conversion of $H_2S$ to sulfur dioxide at temperatures greater than about 300° C. by the reactions:

$$H_2S + \tfrac{3}{2}O_2 \rightarrow H_2O + SO_2 \quad (5)$$

$$1/x\, S_x + O_2 \rightarrow SO_2 \quad (6)$$

Further, sulfur dioxide can form according to the reverse Claus reaction:

$$\tfrac{3}{2x}\, S_x + H_2O \rightarrow H_2S + \tfrac{1}{2}SO_2 \quad (7)$$

Thus, in order to selectively form elemental sulfur, $H_2S$ oxidation should be conducted at temperatures less than about 300° C. However, this is only possible by the use of suitable catalyst. A preferred catalyst should not promote the reverse Claus reaction (reaction (7)) to minimize the formation of $SO_2$. If a solid catalyst is used, the process temperature should be at least 180° C., in order to prevent condensation of formed sulfur on the catalyst. Condensed sulfur blocks the catalyst surface, thereby reducing $H_2S$ oxidation rate.

In sum, to carry out oxidation of selective $H_2S$ to S, catalysts showing high activity at temperatures 180°–300° C. are required. In addition to high activity, it is desirable that the catalysts possess high selectivity, because in the reaction medium, which contains $H_2S$ and $O_2$, in addition to undesirable side reactions (5) to (7) above, other undesirable side reactions which decrease $H_2S$ conversion into S are thermodynamically possible. These other undesirable side reactions include:

$$H_2S + 2O_2 \rightarrow H_2O + SO_3 \quad (8)$$

$$1/x\, S_x + \tfrac{3}{2}O_2 \rightarrow SO_3 \quad (9)$$

These reactions usually take place only at temperatures higher than about 400° C.

For achievement of highly selective oxidation of $H_2S$ into $S_x$ by use of a solid catalyst, preferably the catalyst contains as few small pores and as many large pores as possible. This structure allows molecules of formed sulfur to leave catalysts pores rapidly and thereby avoid reactions (6) and (7). Since a catalyst's surface is generally made up of its pores, catalysts with large pores usually do not have a large specific surface since specific surface is inversely proportional to pore diameter.

Different methods for preparing catalysts with large pores and accordingly small specific surface are known in heterogeneous catalysis. For example, USSR Inventors Certificate 871813 (1981) (which is incorporated herein by reference) discloses an iron oxide based catalyst having specific surface 1–2 $m^2/g$ and average pore diameter 2500–2900 Å for use as a $H_2S$ oxidation catalyst. USSR Inventors Certificate 967551 (1982) (which is incorporated herein by reference) also discloses a catalyst in which an active compound is applied on an inert carrier having a specific surface of 1.5–2.0 $m^2/g$ and an average pore diameter of 2500–3000 Å. U.S. Pat. Nos. 4,818,740 and 5,037,629 disclose catalysts prepared by depositing oxides of iron or oxides of iron and chromium on carriers having large pores and small specific surface for the selective oxidation of $H_2S$ to S.

The pore structure of a catalyst allows the active components of the catalyst to perform effectively. The catalyst pore structure however, by itself, cannot provide high activity and selectivity. These are effected by the chemical and phase composition of the catalyst. Thus, to provide an effective catalyst, chemical and phase composition must be optimized.

However, the level of knowledge of chemistry and catalysis does not allow the prediction of a catalyst composition for a given reaction.

Analysis of periodical and patent literature, reveals that oxides of iron, aluminum, vanadium, titanium, and other metals have been suggested for selective oxidation of $H_2S$ to S. Such oxides display catalytic activity for $H_2S$ oxidation, but they have not found wide application in selective oxidation processes because of their disadvantages. Iron oxide as a catalyst for $H_2S$ oxidation was suggested by Claus about 100 years ago. However, the form of oxides proposed by Claus did not achieve high selectivity. In USSR Inventors Certificate 871873 iron oxide with small specific surface, reduced by calcination at a high temperature to turn $Fe_2O_3$ to $Fe_3O_4$, is disclosed as being more selective than the iron oxide used by Claus. Use of a catalyst containing iron oxide is described in U.S. Pat. Nos. 4,576,925 and 4,519,992, as well as U.K. Patents Nos. 2,164,867A and 2,152,489A, all of which are incorporated herein by reference.

Aluminum oxide ($Al_2O_3$) is also mentioned as a catalyst for $H_2S$ oxidation, but has the disadvantage that it is catalytically active in the reverse Claus reaction (7). In addition, it is not stable and can lose its activity quickly because of surface sulfation.

Vanadium oxide, which is used in catalyst compositions for the Selectox process described in U.S. Pat. No. 4,311,683, has the disadvantage that it is very active for reactions (6) and (7), and therefore does not have a high selectivity for $H_2S$ conversion to S.

Titanium oxide as a catalyst for $H_2S$ oxidation to S has also been suggested. However, this oxide is catalytically active not only in reaction (4), but also for reaction (7). Thus, it can be used for selective oxidation of $H_2S$ by oxygen only for low water content reaction mixtures.

Heterogeneous catalysts containing iron and chromium oxides for $H_2S$ oxidation to S have been described, for example, in U.S. Pat. Nos. 4,818,740 and 4,576,925. More complex catalysts comprising three or more metal oxides have been described, for example, in UK Patent No. 2164867A. In addition to iron and chromium oxides, one of several oxides of the following metals were added in a quantity of 1.5–25% by weight: cobalt, nickel, manganese, copper, zinc and titanium. Although the addition of zinc and titanium oxide can improve the properties of an iron oxide based catalyst, nevertheless these catalysts display noticeable activity in the reverse Claus reaction and in the oxidation of sulfur to $SO_2$.

Accordingly, there is a need for a highly efficient and highly selective catalyst that is effective in converting hydrogen sulfide to sulfur at temperatures above the sulfur dew point to about 300° C.

SUMMARY

The present invention is directed to a process for the selective oxidation of hydrogen sulfide to sulfur at a temperature above the sulfur dew point and up to about 300° C., i.e., no more than about 300° C. In the process, a gas stream comprising hydrogen sulfide and oxygen, preferably from air, is continuously passed over a solid porous catalyst. The catalyst is formed of oxides of (a) iron and (b) zinc. The catalyst has the atomic proportions covered by the formula $Fe_A Zn_B$ wherein A has a value of 0.5 to 10, and B has a value of 1 to 2. Preferably A is from 1 to 5 and B is 1. The catalyst can comprise iron and zinc in an atomic ratio of 2:1, or in an atomic ratio of 3:1. The catalyst contains substantially no chromium for environmental reasons, and preferably consists essentially of oxides of Fe and Zn.

DESCRIPTION

The $H_2S$ conversion process of the present invention utilizes a catalyst at a temperature above the condensation temperature of sulfur, typically greater than about 180° C., up to a temperature of about 300° C. Selective oxidation occurs by continuously passing a gas stream comprising hydrogen sulfide and oxygen, normally provided from air, over the catalyst at a space velocity of 1000 to 6000 $hr^{-1}$ or more. The feed gas typically contains at least 0.1%, by volume, $H_2S$ and no more than about 50%, by volume, $H_2S$. The temperature preferably is maintained below about 300° C. to ensure that conversion of hydrogen sulfide to sulfur is maximized. An inert gas coolant such as nitrogen can be used. Water content has little impact on the level of conversion of hydrogen sulfide. In all instances it has been observed that the level of hydrogen sulfide conversion is in excess of about 95 percent with approximately 92 to 96 percent of the sulfur in $H_2S$ present in a gas selectively converted to elemental sulfur.

Substantially any gas containing $H_2S$ can be treated using this process. For example, a process according to this invention can be applied to direct conversion of hydrogen sulfide to elemental sulfur, used in the last catalytic stage of a Claus unit, or used to process tail gas streams discharged from a Claus plant to convert residual hydrogen sulfide in such gas streams, after all of the sulfur has been hydrogenated to hydrogen sulfide, to elemental sulfur. The process can also be used to treat a primary gas from an amine unit.

The iron/zinc catalyst used in the present invention can be prepared by many procedures, using different initial compounds, containing iron and zinc. Conditions are chosen so that zinc ferrites can be easily achieved by calcination of intermediates during the last stage of catalyst preparation at temperatures from about 600° C. to about 1000° C. Several hours are enough. Higher temperatures and very long calcination can result in catalyst sintering.

The catalysts of this invention are normally prepared by forming an aqueous solution of soluble salts of the metals to be combined. A base is added to cause precipitation of the salts in the hydroxide form. The precipitate is then partially dried and formed into desirable catalyst shape and converted to the corresponding oxides by calcination. Calcination normally occurs with the temperatures from 600° C. to 1000° C. The formed catalysts have a surface area of about 1 to 5 $m^2/g$ with at least 90% of pore diameters being greater than about 500° Å. Pores are attributed to the lattice work of the formed oxides. Preferably, deposition onto a carrier is not resorted to so that the entire catalyst is made up of the catalytically active metals. However, a carrier can be used, such as described in USSR Inventors Certificate 871,813.

Examples of catalyst preparation used in a selective oxidation process are shown below:

EXAMPLE 1

A catalyst was prepared from iron and zinc oxides in quantities corresponding to the following atomic ratio: $Fe_2O_3:ZnO=1:1$ was used. The oxides were thoroughly ground to a powder and mixed in a ball mill. Water was added with mixing. The prepared paste was deposited on a gypsum board, which was covered by cotton cloth and left on the board for 24 hours at room temperature for dewatering. The paste, with a moisture content of 32–33%, was shaped by a screw-extruder. The resultant extrudates, having a diameter of 4 mm, were cut into parts with a length of 4–6 mm, dried at 130°–140° C. for 4–5 hours, then calcined for 3.5 hours at 850° C.

EXAMPLE 2

A catalyst was prepared according to Example 1, but in quantities proportional to the atomic ratio of Fe:Zn=3:1.

EXAMPLE 3

Catalysts, prepared as described in Examples 1 and 2 were used for $H_2S$ oxidation. For this purpose, the catalysts were loaded into a once-through reactor with electric furnace heating. A gas mixture, consisting of specified quantities of $H_2S$, $O_2$ and water vapor passed through the reactor. Nitrogen was used as a diluent. In order to examine the effect of individual gas mixture components different amounts of $H_2$, $CH_4$ and other saturated hydrocarbons, $CO_2$ and others were added. Gas was passed through the reactor at a space velocity of 3000–5000 per hr. $H_2S$ concentration was varied in a range of 1–3%; $H_2O$ vapor content varied in a range of 3–30% vol.

The results of catalyst activity determination are shown in Table 1. Tests were carried out at $O_2:H_2S=0.6$.

TABLE 1

| Example No. | Catalyst Composition mol. % | | Process Condition | | | Total Conversion of $H_2S$, % | S Recovery, % |
|---|---|---|---|---|---|---|---|
| | $Fe_2O_3$ | ZnO | Temp (°C.) | Space Velocity $(Hr^{-1})$ | $H_2S$ Concentration | | |
| 1 | 50 | 50 | 250 | 3000 | 2.0 | 96.2 | 93.4 |
| 1 | 50 | 50 | 270 | 3000 | 2.0 | 97.6 | 93.3 |
| 2 | 60 | 40 | 230 | 3000 | 2.0 | 97.0 | 93.1 |
| 2 | 60 | 40 | 250 | 5000 | 2.0 | 96.3 | 93 |

The addition of $H_2$, saturated hydrocarbons, or $CO_2$ to the reaction mixture had little effect on total conversion or sulfur recovery.

Although the present invention has been described in considerable detail with reference to certain preferred versions thereof, other versions are possible. Therefore, the scope of the appended claims should not be limited to the description of the preferred versions contained herein.

What is claimed is:

1. A continuous process for the selective catalytic oxidation of hydrogen sulfide to elemental sulfur comprising reacting a gas stream comprising hydrogen sulfide and oxygen in a molar ratio of $O_2:H_2S$ of about 0.5 to about 0.6, at a temperature above the dew point of sulfur and no more than about 300° C., over solid porous catalyst consisting essentially of oxides of iron and zinc, so as to convert at least about 90% of the hydrogen sulfide within the gas stream to elemental sulfur, the catalyst having the atomic proportions covered by the formula $Fe_AZn_B$, wherein A has a value of 0.5 to 10 and B has a value from 1 to 2, the catalyst containing substantially no chromium.

2. The process as claimed in claim 1 in which the catalyst comprises iron and zinc in an atomic ratio of 2:1.

3. The process as claimed in claim 1 in which the catalyst comprises iron and zinc in an atomic ratio of 3:1.

4. The process as claimed in claim 1 in which A is 1 to 5 and B is 1.

5. The process as claimed in claim 1 in which the reacting of the gas over the catalyst is carried out at a temperature of no more than about 270° C.

6. The process as claimed in claim 1 in which the total conversion of hydrogen sulfide within the gas stream to elemental sulfur by reacting the gas over the catalyst is at least about 95%.

7. The process as claimed in claim 1 in which the reacting of the gas over the catalyst is carried out at a pressure of no more than about 2 atmospheres.

8. The process as claimed in claim 1 in which the total conversion of hydrogen sulfide within the gas stream to elemental sulfur by reacting the gas over the catalyst is between about 92% and about 96%.

9. A continuous process for the selective catalytic oxidation of hydrogen sulfide to elemental sulfur comprising the steps of:

(a) reacting a gas stream comprising hydrogen sulfide and oxygen in a molar ratio of $O_2:H_2S$ of about 0.5 to about 0.6 in a reactor containing a solid porous catalyst consisting essentially of oxides of iron and zinc, the catalyst having the atomic proportions covered by the formula $Fe_AZn_B$, wherein A has a value of 0.5 to 10 and B has a value from 1 to 2, the catalyst containing substantially no chromium;

(b) maintaining the temperature of the reactor above the dew point of sulfur but no more than about 300° C. so as to convert at least about 90% of the hydrogen sulfide to elemental sulfur; and (c) removing the gaseous elemental sulfur from the reactor.

10. The process of claim 9 in which the catalyst comprises iron and zinc in an atomic ratio of 2:1.

11. The process as claimed in claim 9 in which the reacting of the gas over the catalyst is carried out at a temperature of no more than about 270° C.

12. The process as claimed in claim 9 in which the total conversion of hydrogen sulfide within the gas stream to elemental sulfur by reacting the gas over the catalyst is at least about 95%.

13. The process as claimed in claim 9 in which the reacting of the gas over the catalyst is carried out at a pressure of no more than about 2 atmospheres.

14. The process as claimed in claim 9 in which the total conversion of hydrogen sulfide within the gas stream to elemental sulfur by reacting the gas over the catalyst is between about 92% and about 96%.

15. A continuous process for the selective catalytic oxidation of hydrogen sulfide to elemental sulfur comprising the steps of:

(a) reacting a gas stream comprising hydrogen sulfide and oxygen in a molar ratio of $O_2:H_2S$ of about 0.5 to about 0.6 in a reactor containing a solid porous catalyst consisting essentially of oxides of iron and zinc, the hydrogen sulfide within the gas stream to elemental sulfur, the catalyst having the atomic proportions covered by the formula $Fe_AZn_B$, wherein A has a value of 0.5 to 10 and B has a value from 1 to 2, the catalyst containing substantially no chromium;

(b) maintaining the pressure within the reactor below about two atmospheres so as to convert at least about 90% of the hydrogen sulfide to elemental sulfur; and (c) removing the gaseous elemental sulfur from the reactor.

16. The process as claimed in claim 15 in which the catalyst comprises iron and zinc in an atomic ratio of 2:1.

17. The process as claimed in claim 15 in which the catalyst comprises iron and zinc in an atomic ratio of 3:1.

18. The process as claimed in claim 15 in which A is 1 to 5 and B is 1.

19. The process as claimed in claim 15 in which the passing of the gas over the catalyst is carried out at a temperature of no more than about 270° C.

20. The process as claimed in claim 15 in which the total conversion of hydrogen sulfide within the gas stream to elemental sulfur by reacting the gas over the catalyst is at least about 95%.

21. The process as claimed in claim 15 in which the total conversion of hydrogen sulfide within the gas stream to elemental sulfur by reacting the gas over the catalyst is between about 92% and about 96%.

22. A continuous process for the selective catalytic oxidation of hydrogen sulfide to elemental sulfur comprising the steps of:

(a) reacting a gas stream comprising hydrogen sulfide and oxygen in a molar ratio of $O_2:H_2S$ of about 0.5 to about 0.6 to a reactor containing a solid porous catalyst consisting essentially of oxides of iron and zinc, the catalyst having the atomic proportions covered by the formula $Fe_AZn_B$, wherein A has a value of 0.5 to 10 and B has a value from 1 to 2, the catalyst containing substantially no chromium;

(b) maintaining the temperature of the reactor above the dew point of sulfur but no more than about 300° C. and maintaining the pressure within the reactor below about two atmospheres so as to convert at least about 90% of the hydrogen sulfide to elemental sulfur; and (c) removing the gaseous elemental sulfur from the reactor.

23. The process as claimed in claim 22 in which the catalyst comprises iron and zinc in an atomic ratio of 2:1.

24. The process as claimed in claim 22 in which the catalyst comprises iron and zinc in an atomic ratio of 3:1.

25. The process as claimed in claim 22 in which A is 1 to 5 and B is 1.

26. The process as claimed in claim 22 in which the passing of the gas over the catalyst is carried out at a temperature of no more than about 270° C.

27. The process as claimed in claim 22 in which the total conversion of hydrogen sulfide within the gas stream to elemental sulfur by reacting the gas over the catalyst is at least about 95%.

28. The process as claimed in claim 22 in which the total conversion of hydrogen sulfide within the gas stream to elemental sulfur by reacting the gas over the catalyst is between about 92% and about 96%.

29. The process as claimed in claim 22 in which the reactor is maintained at a temperature between about 180° C. and about 300° C.

30. The process as claimed in claim 22 in which the reactor is maintained at a temperature between about 180° C. and about 270° C.

* * * * *